UNITED STATES PATENT OFFICE.

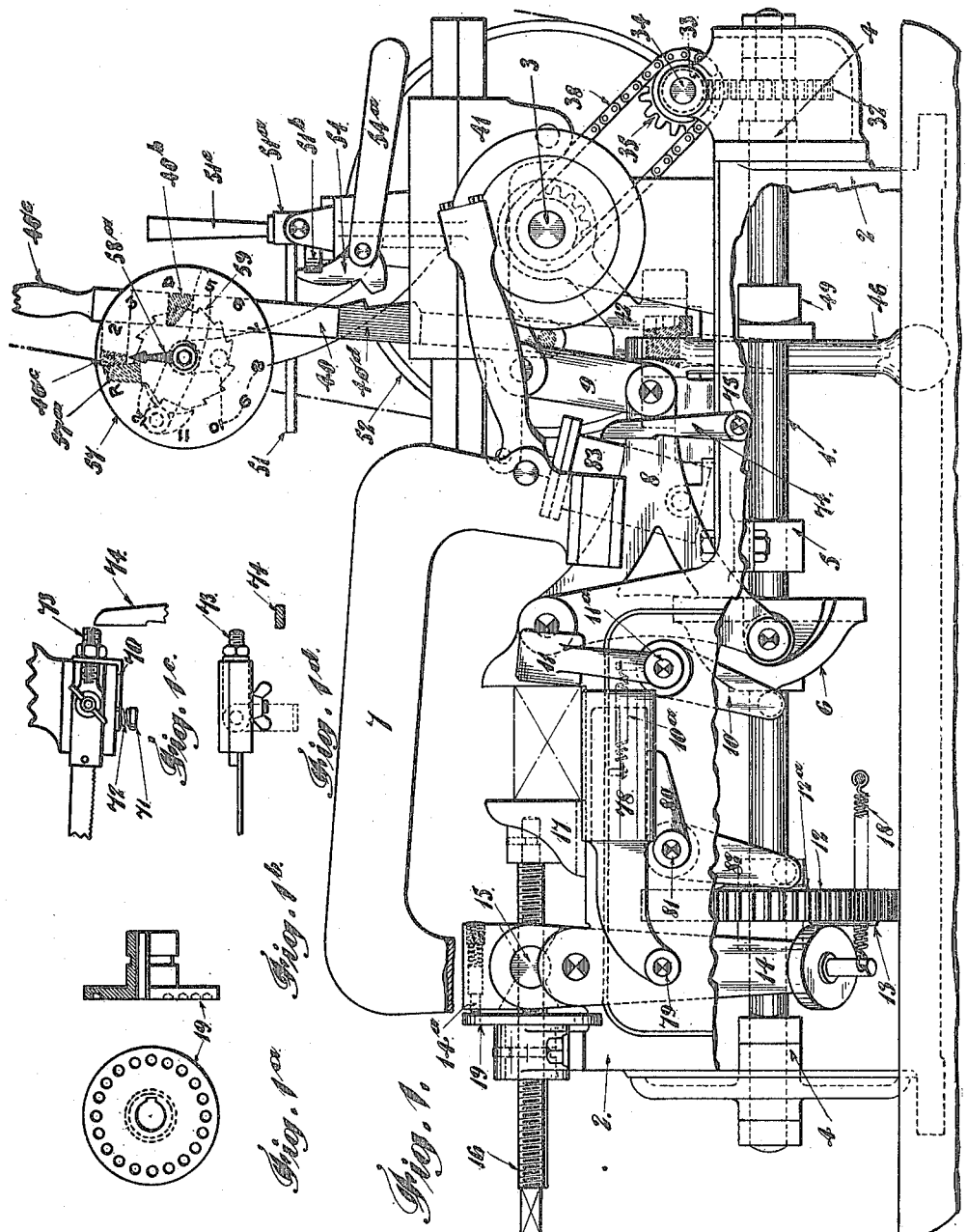

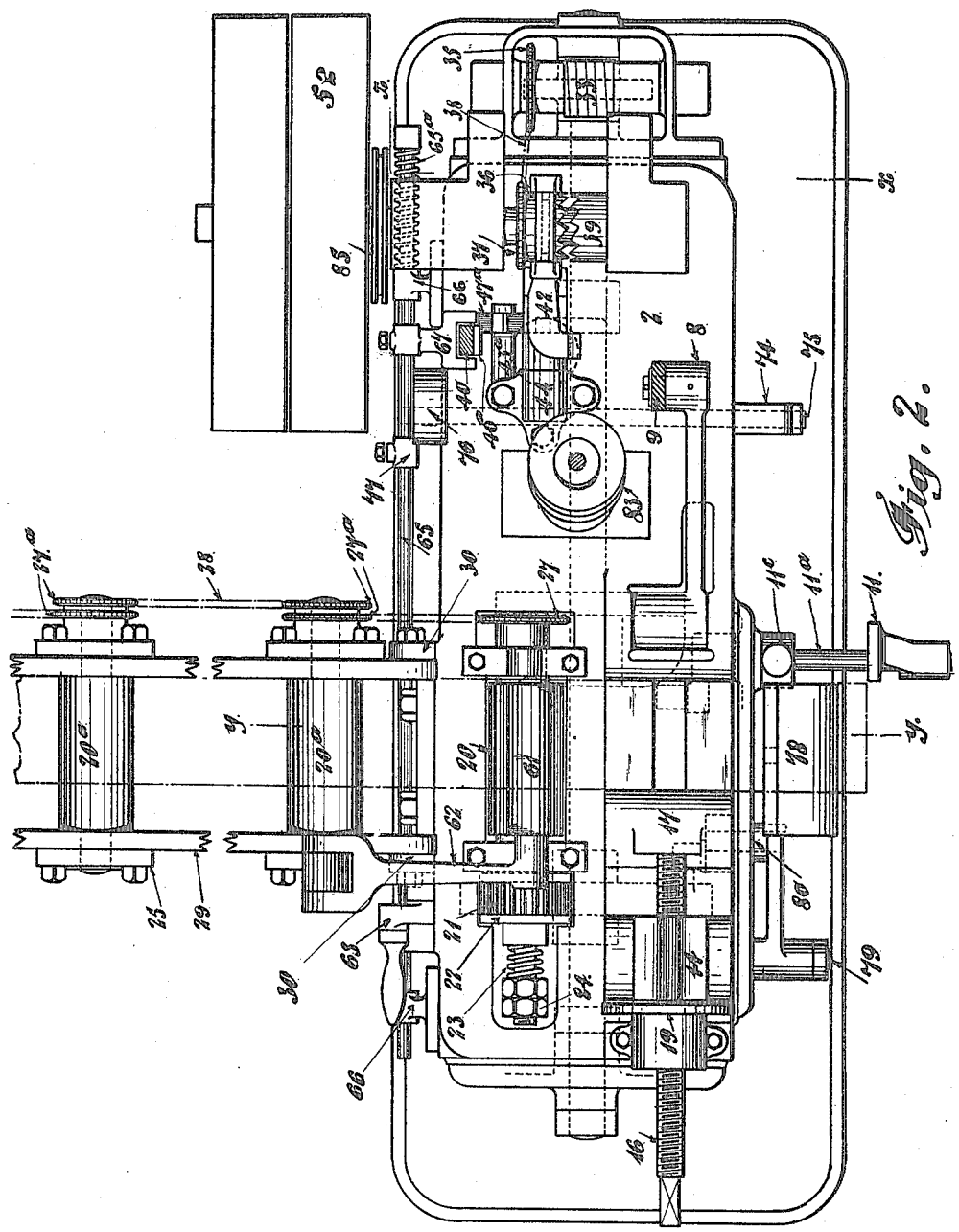

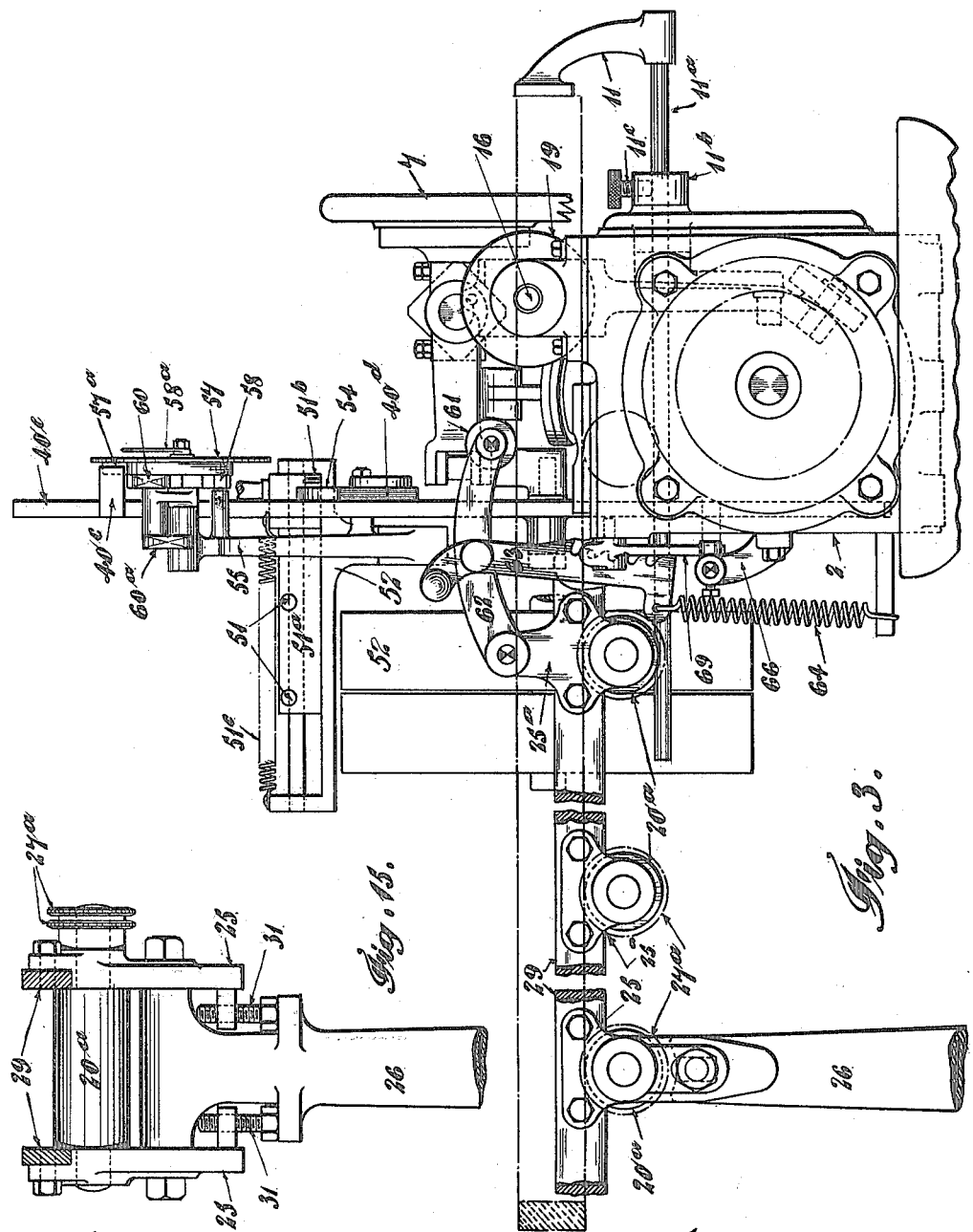

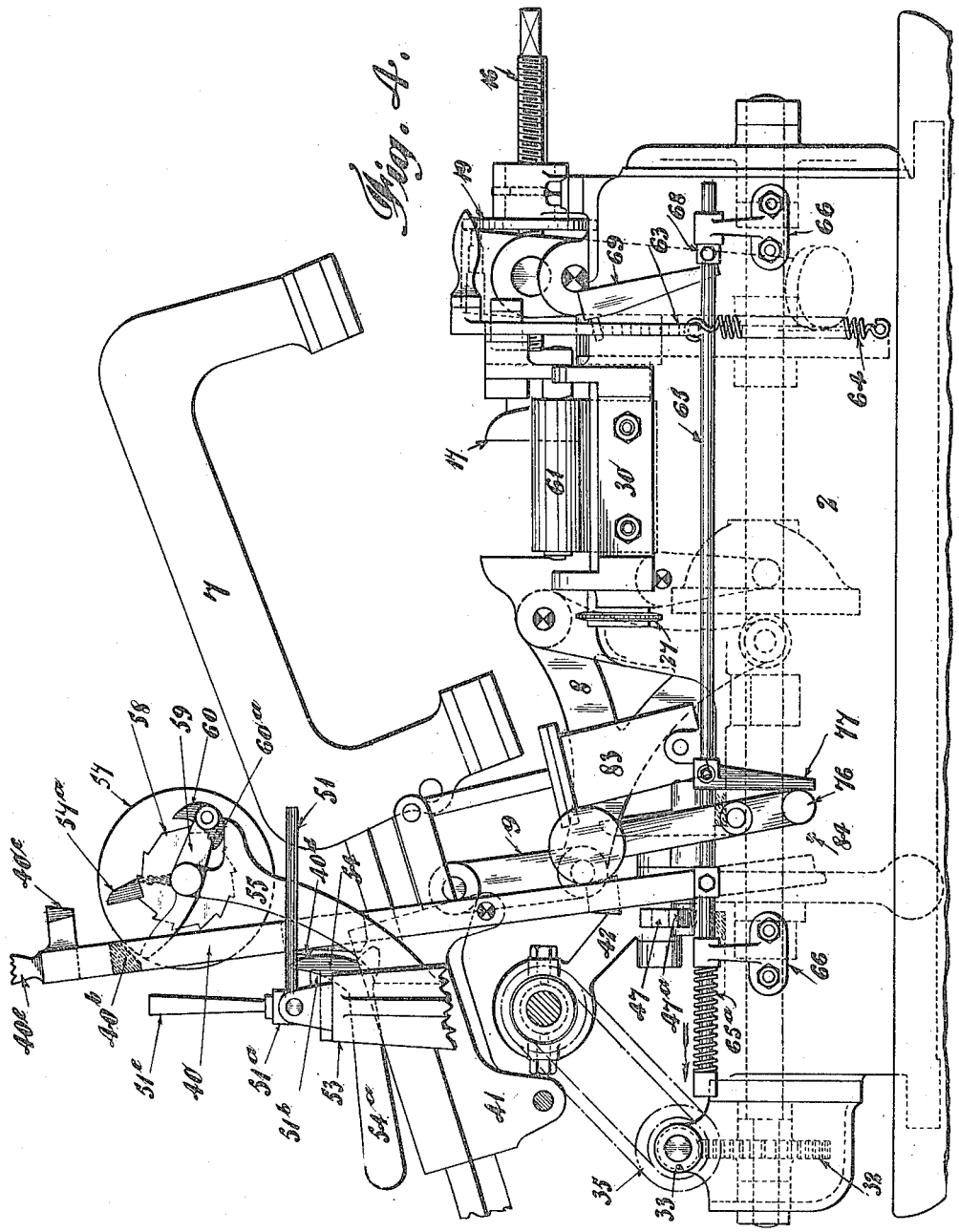

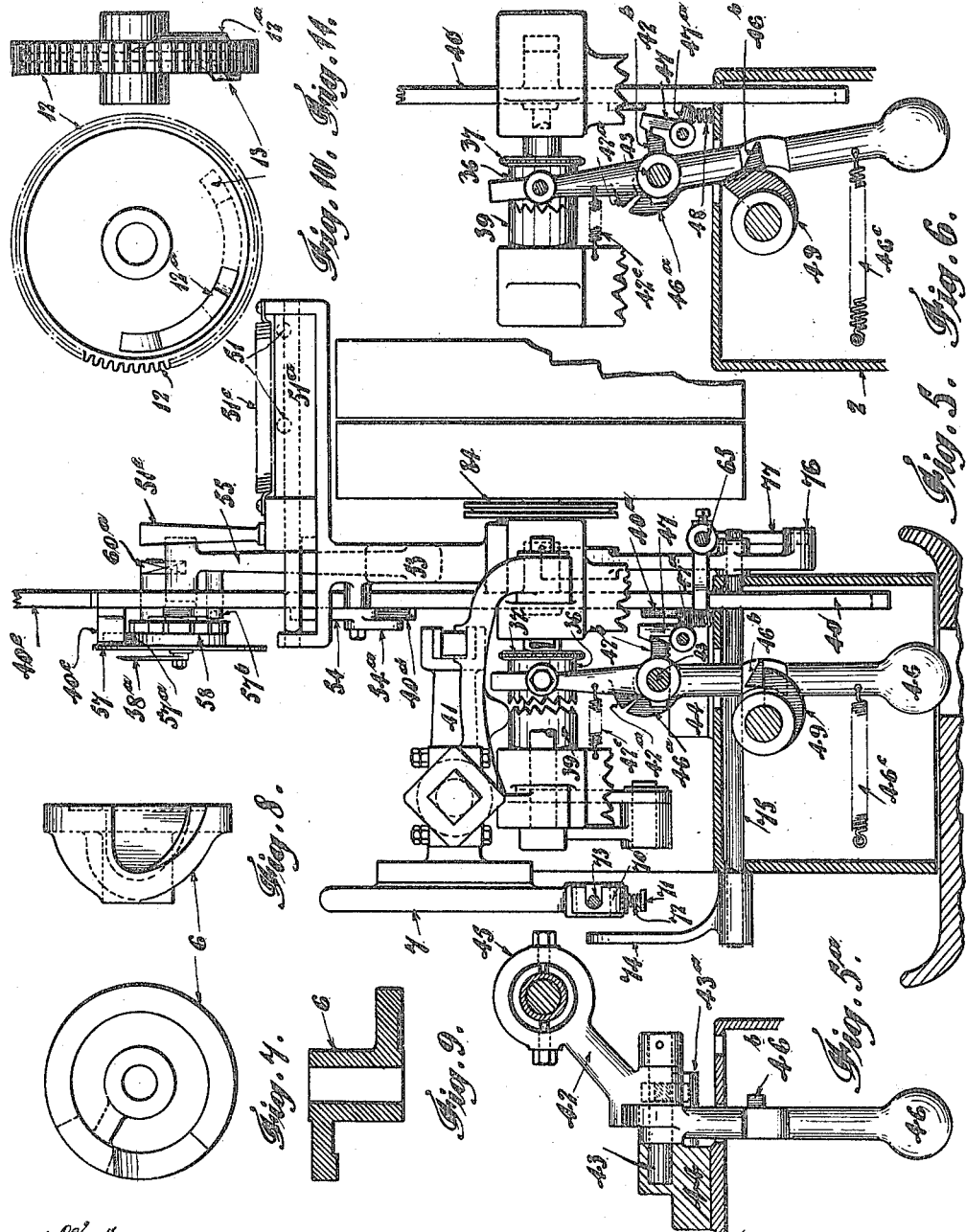

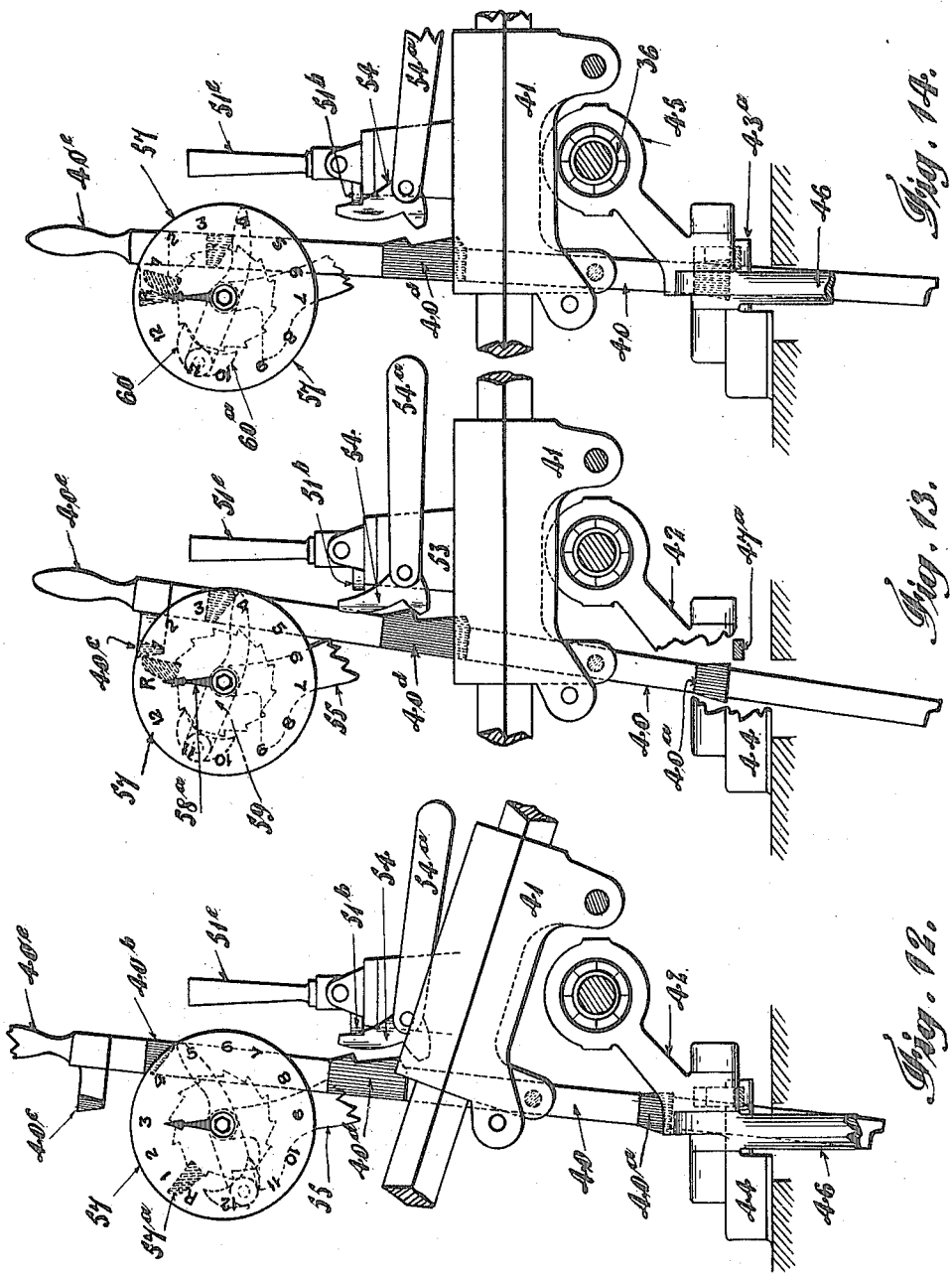

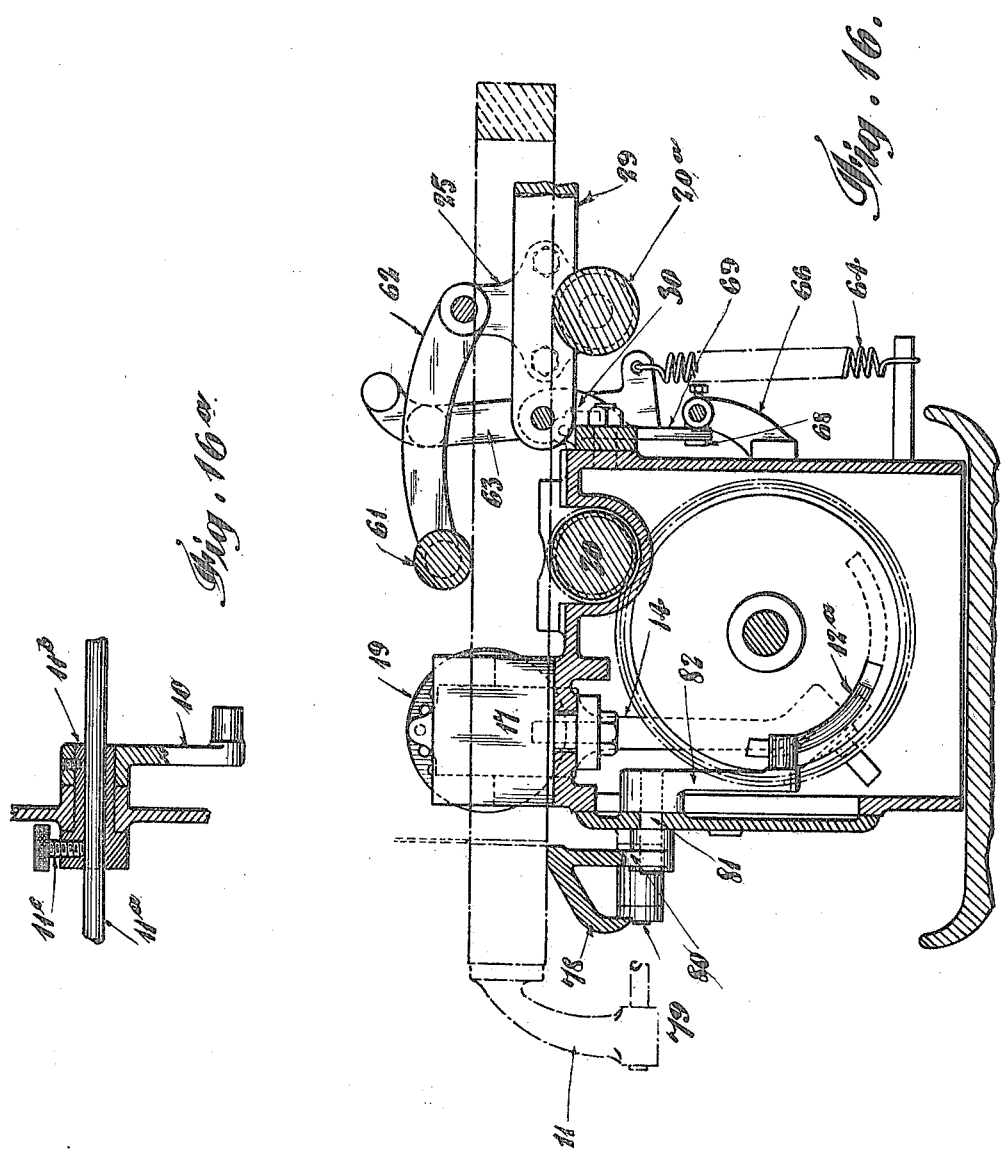

EDWARD GEISLER HERBERT AND CHARLES FLETCHER, OF LEVENSHULME, ENGLAND.

AUTOMATIC HACK-SAWING MACHINE.

1,193,262. Specification of Letters Patent. Patented Aug. 1, 1916.

Application filed July 24, 1914. Serial No. 852,812.

*To all whom it may concern:*

Be it known that we, EDWARD GEISLER HERBERT and CHARLES FLETCHER, both subjects of the King of Great Britain and Ireland, and residents of Levenshulme, Manchester, England, have invented certain new and useful Improvements in Automatic Hack-Sawing Machines, of which the following is a specification.

This invention refers to automatic hack sawing machines of the kind in which successive cuts are made automatically through metal bars, tubes and the like. In such machines it has previously been proposed to automatically throw the repeat mechanism out of gear when the work is all cut up, but no provision has been made to automatically throw such mechanism out of gear or to stop the machine after a single cut or after any desired number of successive cuts. Further, in such machines it has been possible, while the work-holding vise has been held open by the automatic vise-opening and closing mechanism for the regulating screw to be adjusted and thereby cause damage to the vise jaws on the next closing of the vise.

The chief features of this invention are: (*a*), an arrangement of regulating mechanism whereby the machine, or the repeat mechanism only, may be stopped or thrown out of action automatically after a single cut, or after any predetermined number of successive cuts, as well as when the whole of the work is cut up; (*b*), an arrangement of devices for automatically locking the movable jaw of the work-holding vise against hand adjustment while held open by the automatic vise opening and closing devices.

Other features are: (*c*), an improved arrangement of repeat mechanism and devices for controlling the repeat mechanism; (*d*), an improved arrangement of work-feeding rollers; (*e*), a rising and falling work support; (*f*), an improved arrangement of devices by which the machine, or the repeat mechanism is automatically stopped or thrown out of action on the saw blade breaking; and (*g*), the combination of certain known parts with the before named parts.

Upon the accompanying drawings, Figure 1 illustrates a side elevation. Fig. 2 a plan, and Fig. 3 an end elevation of a hack sawing machine embodying the invention, certain parts being shown broken away to facilitate the explanation of the invention. Fig. 4 illustrates a further side elevation of the machine, but from the opposite side to that shown in Fig. 1 and with several of the parts in different positions from that shown in Fig. 1. Figs. 5 and 6 illustrate respectively transverse sectional elevations of the machine on line $x$—$x$, see Fig. 2, certain of the parts being shown in one position in Fig. 5 and in another position in Fig. 6. Fig. 7 illustrates a face view, Fig. 8 an edge view, and Fig. 9 a cross section of a cam used in the machine. Fig. 10 illustrates a side view, and Fig. 11 an edge view of a gear wheel hereinafter described. Figs. 12, 13 and 14 illustrate side or face views respectively of certain regulating apparatus used in the machine, the three views, in conjunction with the views of the same parts in Figs. 1 and 4, illustrating the manner in which the machine, or the repeat mechanism is set to stop, and is stopped automatically after a single cut or any predetermined number of successive cuts, as well as when the whole of the work is cut up. Fig. 15 illustrates a front view of one of the standards and rollers and a cross-section of the rails by which the "bar" to be cut up is supported, fed forward and guided after each cut. Fig. 16 illustrates a transverse section of the machine on line $y$—$y$, see Fig. 2. Figs. 1$^a$, 1$^b$, 1$^c$, 1$^d$, 5$^a$ and 16$^a$ illustrate details hereinafter described.

As before stated, machines of the kind to which the invention relates comprise mechanism by which the sawing operations are caused to be repeated after each length is cut off, the repeat mechanism being designed to raise the saw frame, open the work holding vise, feed forward the work and reclose the vise. The repeat mechanism according to this invention comprises a rotary shaft 1 arranged below the stand or body 2 of the machine at right angles to the driving shaft 3 and in bearings 4 and 5, see Fig. 1. Keyed upon this shaft is a cam 6 designed on being rotated one complete revolution after the saw has cut through the work, to raise the saw-holding frame 7 to its highest position. The cam 6 raises the saw frame through the medium of a lever 8 and link 9. The cam 6 is also designed, when rotated, and in conjunction with a spring 10$^a$ to operate upon a lever arm 10, whereby the usual "stop" 11, just prior to the work being fed forward is moved into a position opposite the opening of the vise, and also whereby after the work has been fed forward the stop is moved out of the path of the work. The repeat mechanism also comprises a spur wheel 12 see Figs. 1, 10 and 11, keyed upon the shaft 1, hereinafter called the cam shaft. Upon one side of the wheel 12 is a segmental cam face 13 adapted to bear upon one end of the lever 14. This lever near to its other end engages with pins on the nut 15 of the vise-jaw regulating screw 16 and with the lever bearing against the cam face 13 holds the vise jaw 17 in contact with the work. A spring 18, see Fig. 1, serves to move the jaw 17 clear of the work when the lever is not acted upon by the said cam face 13. Let into, and projecting from, the shorter arm of the said lever 14 is a spring-pressed pin 14$^a$. Mounted upon the regulating screw 16 is a plate 19 having a number of holes or sinkings near its periphery, see Figs. 1, 1$^a$ and 1$^b$. Such plate is held to the screw by a sliding key, and while free to rotate with the screw is held against endwise movement by a pin and groove, see Figs. 1 and 1$^b$. When the movable vise jaw 17 is held open by the spring 18, the pin 14$^a$ engages one of the sinkings in the plate 19 and thus, on an attempt being made to rotate the screw 16, the pin and plate prevent rotation. When, however, the loose jaw 17 is not held open by the spring 18, the screw is free to be rotated, the pin 14$^a$ then lying clear of the sinking in the plate.

Rotatably mounted in a sunken part of the stand 2 of the machine, and alongside the vise jaws, is a feed roller 20, see Fig. 16, a part of the periphery of which extends, as shown, slightly above the top face of the stand. Loosely mounted upon the axis of this roller is a small spur pinion 21, see Fig. 2 with which gears the spur wheel 12. By means of friction plates 22, spring 23 and nuts 24, see Fig. 2, the said pinion is frictionally connected to the roller axis. Mounted in brackets 25, carried by a row of standards 26, see Figs. 2, 3 and 15 are a number of further feed rollers 20$^a$. Upon these rollers rests the bar or other object to be fed to the machine, the several rollers being of equal size and all lying on the same level. To one end of the feed roller 20 is fitted a sprocket wheel 27, while to one end of each feed roller 20$^a$ are fitted two small sprocket wheels 27$^a$. By means of a series of endless chains 28 the whole of the feed rollers are rotated from the first feed roller 20, when such roller receives motion from the cam shaft 1. On the bar meeting the "stop" 11, the rollers 20, 20$^a$ either slip under the bar, or, if the bar is a heavy one, they cease to rotate, the friction plates 22 slipping under the resistance offered to their rotation by the bar.

Rails 29 are provided to carry certain of the rollers 20$^a$ see Fig. 3, which are supported in brackets 25$^a$, and also to guide the bar and prevent its leaving the rollers, each rail being supported by the brackets 25 and being pivoted at one end to a bracket 30 secured to the machine see Figs. 2 and 16. By means of screws 31, see Fig. 15, the rails are adjustable in height to suit the level of the machine.

Upon that end of the cam shaft 1 nearest the driving shaft 3 is a worm wheel 32 with which meshes a worm 33 carried upon a shaft 34 arranged immediately above and transversely of the cam shaft. Upon and keyed to the worm shaft 34 is a small sprocket wheel 35 and upon the driving shaft 3 of the machine is a sleeve 36 fitted with a like sprocket wheel 37, see Fig. 2. Encircling the sprocket wheels is an endless chain 38, see Fig. 1. The sleeve 36, which is loose upon and capable of sliding along its shaft, is provided at one end with clutch teeth. Upon a further and non-sliding sleeve 39, keyed to the driving shaft, are further clutch teeth, see Fig. 2. On the sliding sleeve 36 being caused to engage the keyed sleeve 39, the motion of the driving shaft is transmitted to the cam shaft 1. By means of suitable control mechanism, hereinafter described, the period of each engagement of the two sleeves 36 and 39 is such as only to allow the cam shaft 1 to make one complete revolution. Further, the sleeves engage each other as soon as a cutting operation is completed and become disengaged before the commencement of the next cutting operation. The said mechanism comprises a bar 40 pivotally mounted upon the saw-frame slide bracket 41. Upon the side of this bar, hereinafter called the control lever, and below the level of its pivot, is a small block or lateral projection 40$^a$, see Figs. 5, 6, 12, 13 and 14. The said mechanism also comprises a lever 42, journaled at one end upon a horizontal pin or pivot 43 mounted in a fixed support 44, see Fig. 5$^a$. The other end of this lever terminates in a yoke or collar 45 adapted to encircle, and, by means of dowels, engage the sliding sleeve 36. The pivot support of this lever, hereinafter called the yoke lever, lies at a lower elevation than the said sliding sleeve 36 and the lever is therefore slightly inclined. Journaled upon the said pin 43 is a further and pendant lever 46, which extends through an opening in the machine stand and to a point below the cam shaft 1, its lower end being weighted, see Figs. 1, 5 and 6. Upon the boss of this further lever, hereinafter called the weight lever, is a projection 46$^a$ with one face radiating from the center of the boss, and coming immediately in the path of a like projection 42$^a$ on the yoke lever. Upon the boss of the yoke lever is a further projection 42$^b$ with beveled extremity. The three projections 42ª, 42ᵇ and 46ª, when the levers are moved about the pin 43, move in a vertical plane parallel with the driving shaft 3. Normally engaging with the projection 42ᵇ is a small catch lever 47 pivoted to an extension 43ª of the said fixed support 44. Extending rearwardly and horizontally from the catch lever 47 is a small lug or projection 47ª. By means of a spring 48 and the catch lever 47, the yoke lever 44 is normally held in a position in which the clutch teeth of the sleeve 36 lie clear of the clutch teeth of the sleeve 39.

Upon the cam shaft 1 is a further cam 49, preferably in the form of a scroll, the edge of which is designed to engage a projection 46ᵇ on the weight lever 46, and, on the shaft being rotated, causes the lever 46 to rotate a portion of a revolution about its fulcrum and then release the lever and allow it, by its own momentum and under the action of a spring 46ᶜ, to quickly return to a point slightly beyond its first position, the weighted end of the lever causing the lever to finally assume the vertical, see Fig. 5. The action of these parts is brought about by the aforesaid control lever 40 when lowered by the saw frame guide bracket 41. That is to say, just after the saw has cut through the work, the projection 40ª on the lever 40 meets and presses against the projecting lug 47ª on the catch lever 47, see Figs. 1 and 6, and moving the lever on its pivot releases the yoke lever 44, which, under the action of a spring 42ᶜ, moves the sliding sleeve 36 into engagement with the sleeve 39 thus starting the cam shaft 1 and bringing about, first the raising of the saw frame, then the opening of the vise, then the advancing of the work against the "stop" 11, and then the closing of the vise, the weight lever 46, while such operations are being performed, being moved back until it slips its abutment with the cam 49, when it rebounds rapidly and, by reason of the projection 46ª striking the projection 42ª, returns the yoke lever and sleeve 36 to the neutral position and allows the catch lever 47 to reëngage the projection 42ᵇ on the yoke lever boss. This action takes place each time the control lever descends, except when the lever is operated to stop the machine as hereinafter explained.

The strap forks 51 of the machine driving pulley 52 are carried by a slide block 51ª mounted on a lateral extension of a bracket 53 rising from one of the bearings of the driving shaft 3. On said block is a projection 51ᵇ, while on the bracket 53 is pivoted a trip lever 54, which on engaging the projection is designed to retain the block against the pull of spring 51ᶜ and hold the forks with the belt on the fast pulley.

Rotatably supported at the extremity of an arm 55 branching from the bracket 53 is a dial 57 to the rear face of which is applied a boss 58. In the periphery of this boss are ratchet teeth, see Fig. 4. Upon the fixed axis of the dial is mounted a lever 59 and to one end of this lever is applied a pawl 60 adapted to engage the ratchet teeth of the said boss. At its opposite end the lever 59 extends alongside the lever 40 and below a further lateral projection 40ᵇ on such lever, see Fig. 1. Upon the rear face and near the periphery of the dial is a small radial lug 57ª. At, or near its top end the lever 40 carries a further and beveled block 40ᶜ. Upon the front face of the dial 57 are numerals or like markings, and upon the axis of the dial is a pointer 58ª. Also upon the front face of the dial and between the first and last numerals is the letter R, meaning "Repeat." The lug 57ª is arranged at a point between the letter R and the numeral 1. To the left hand side of the letter R the boss 58 is formed with a blank (no tooth) so that the pawl 60, on such blank part being brought below it, has no effect on the boss and dial.

To set the regulator mechanism to stop the machine after a single cut the dial is rotated until the numeral 1 comes opposite the pointer. In such position of the dial the lug 57ª is brought to a position where, on the lever 40 descending during the cutting off of the first length of bar, etc., the block 40ᶜ will not be affected by the lug 57ª, see Fig. 1, while on the bar making its next descent such block 40ᶜ will come into the path of the lug 57ª. With the simultaneous depression of the lever 59 by the block 40ᵇ the lug will press against the block 40ᶜ and rock the lever 40 about its pivot, thereby causing the lever, as it continues to descend and through the medium of a further block 40ᵈ, to engage the trip lever 54 and thus stop the machine.

To set the regulator mechanism to stop the machine after a predetermined number of successive cuts, the dial is rotated until the numeral corresponding to the number of cuts required (which in the example shown may be 1 to 12) comes opposite the extremity of the pointer, see Fig. 12.

The action of the parts is as follows: As the lever 40 descends and the work is cut through, the block 40ª strikes the lug 47ª of lever 47, thus setting in motion the repeat mechanism aforesaid. Simultaneously the block 40ᵇ strikes the pawl lever 59 and through the pawl advances the boss and dial one tooth. On the lever 40 again descending and the work being again cut through, the block 40ª again strikes the lug 47ª and the block 40ᵇ again strikes the pawl lever, this latter, through the pawl, again advancing the boss and dial one tooth. These operations take place with each length of bar cut off and until the lug 57ª on the dial is brought to a point nearly opposite the pointer, see Fig. 1, when with the next downward movement of the lever, the lever 54 is tripped and the machine stopped, the block 40ª missing the lug 47ª, see Fig. 13, as it descends and thus keeping the repeat mechanism out of action.

To set the regulator mechanism to keep the machine in operation until the whole of the work is cut up, the dial 57 is rotated until the lug 57ª on its rear face lies to the right of the pointer and in a position where the block 40ᶜ on the lever 40 cannot meet it, and where the blank in the boss 58 comes opposite the pawl 60, see Fig. 14. Further, a roller 61 is provided above the work in the vise, such roller being designed to bear on the work and being supported at the end of a lever arm 62, see Figs. 2 and 3. Depending from the arm 62 is a rack plate 63, which at its lower end is connected by a spring 64 to a pin on the side of the machine stand 2. Alongside the stand 2 and extending from one end to the other is a rod 65 supported in guides 66 and at one point provided with a fork 67 for the control lever 40 to project through, see Fig. 2. A spring 65ª exerts a pull on the rod 65 toward the right (Fig. 2). Upon the rod 65, near the vise, is a collar 68 and engaging such collar is one arm of a bell-crank lever 69, see Fig. 4. The other arm of this lever enters one of the notches in the rack plate 63, see Figs. 3 and 4.

The action is as follows: With each piece of bar, etc., cut off, the lever 40 acts, through block 40ª, upon the repeat mechanism, while lever 59 has no effect on the boss and dial. As soon, however, as the last cut has been made and the last length fed forward and beyond the roller 20, the roller 61 loses its support and falls toward the roller 20. In so doing it allows the rack plate 63 to move the bell-crank lever 69 about its pivot and thereby slide the rod 65 and fork 67 in a direction which causes the lever 40, when next it descends, to be moved into engagement with the belt-fork trip lever 54 and thus stop the machine. With the lever 69 always bearing against the collar 68, the fall of the roller 61 after the bar has passed from beneath it, is regulated by the depth of the tooth in the rack plate 63. With a variation in the thickness of the bar, the rack plate is raised or lowered, the bell-crank lever always engaging the tooth which comes opposite to it. The block 40ᵇ is beveled to prevent its striking the top of the lug 57ª. The pawl 60 is on a pin which also carries a reversed pawl 60ª, which latter serves, on meeting a branch of the arm 55, to free the pawl 60 from the ratchet teeth and to support the lever 59 when at rest.

For bringing about the automatic stopping of the machine when the saw blade breaks, the saw frame (see Figs. 1, 1ᶜ, 1ᵈ) is fitted with a bent swivel plate 70, which is pivotally held to the frame by a stud 71, and under the torsion of a spring 72, tends to lie at right angles to the frame, see Fig. 1ᵈ. When, however, the saw blade is in the frame and held in tension by the usual bolt and nut 73, the upstanding part of the said plate 70 is designed to lie between the nut and the frame end, the pressure of the nut holding the plate in line with the frame. Upon the saw blade becoming broken the tension of the nut is destroyed and the swivel plate allowed to move about its pivot into the position shown dotted in Fig. 1ᵈ. In such position and with the saw frame making its return stroke, the plate 70 meets and bears against a lever arm 74 mounted upon a spindle 75, and through such arm partially rotates the spindle. Upon this spindle, which extends to the other side of the machine stand 2, is a further and weighted lever 76, see Fig. 4, which lies in the path of a branch or collar 77 on the stop rod 65. On the spindle 75 being partially rotated, as aforesaid, the lever 76 strikes the collar 77 and moves the rod 65 toward the right hand end of the machine, see Fig. 4, thereby swiveling the lever 40 about its pivot and causing the block 40ᵈ, on the next downward movement of the lever, to trip the catch lever 54 and stop the machine. A small spring-loaded friction ball 57ᵇ, see Fig. 5, engaging a depression in the boss 58 prevents the boss and dial over-running when moved by the pawl.

For supporting the forward end of the bar during each sawing operation, a work support 78 is provided, see Figs. 1 and 16. This support is mounted upon a stud 79 and rests upon a lever arm 80 carried by a spindle 81. This spindle passes through the wall of the stand, see Fig. 16, and within the stand it is fitted with a further lever arm 82, which, by means of a stud at its free end, bears against a cam face 12ª on the gear wheel 12. With the rotations of the wheel 12, the rod 81 is given a partial rotation either to raise the work support to the level of the work, or lower it clear of the work. The lowering of the support takes place at the time the work is being fed forward against the "stop" 11 and the raising takes place after the work has come against the "stop", the object of the lowering being to avoid any possibility of the work being obstructed by the support as the work moves forward.

The rod 11ª (see Figs. 1 and 16ª) which carries the "stop" 11 and which is adjustable longitudinally to suit various lengths to be cut off, passes through a rotary bush 11ᵇ, which, within the stand 2, is provided or formed with the lever arm 10. The bush is adjustably secured to the rod 11ª by screw 11ᵉ. The saw blade will preferably be arranged at an oblique angle to the saw frame guides, and an oil or like dash pot 83 will be provided to regulate and check the downward movement of the saw frame. The cam 6 is shown separately in Figs. 7, 8 and 9, one of its faces being for use in operating the lever arm 10 and the other face for use in operating the lever arm 8 and allowing the saw to move downward during the cutting stroke.

For holding the frame raised, say prior to starting, the lower end of the control lever 40, which is formed with a shoulder, see Fig. 4, is caused by its handle 40ᵉ, against the slight resistance of the spring 65ᵃ, to rest upon a fixed pin 84 in the machine stand. On the saw frame being slightly raised by hand the lever 40 is pushed by the spring 65ᵃ off the pin 84, thus allowing the frame to descend and operate on the work. The strap fork slide block 51ᵃ is provided with a handle 51ᵉ by which the operator starts the machine and sets the trip lever 54. This lever is provided with a handle 54ᵃ by which it may be operated by hand to stop the machine. Such handle also serves as a weight to hold the lever in engagement with the projection 51ᵇ.

The machine stand will preferably be mounted upon an ordinary table or bed and will be furnished with the usual accessories such as a wheel 85, see Fig. 2, and a pump for delivering suds on to the saw blade while cutting, and also with loose weights for varying the pressure on the saw during the cutting stroke, etc.

If desired, the roller 61 and rack 63 may be dispensed with, and the machine set to stop automatically only by means of the dial and control lever mechanism. Also as before stated, instead of stopping the machine, the lever 40 may serve merely for the throwing of the repeat mechanism out of action, the block 40ᵈ being omitted.

In Fig. 4 the various parts of the machine are shown in the at rest position, the roller 61 having dropped to its lowest position, thus allowing the bell crank lever 69 under the pull of spring 64 to move the rod 65 endwise, and in a direction opposite to that of the arrow. By means of the fork 67 (see Fig. 2) the endwise movement of the rod 65 is imparted to the lower part of the lever 40, thereby causing it to be moved to a position where the block 40ᵃ will lie out of its normal path (see Fig. 13) and miss the projection 47ᵃ of lever 47 as the lever 40 continues its downward movement. In thus missing the projection 47ᵃ the block 40ᵃ fails to restart the repeat mechanism. With the roller 61 raised to admit a new bar, the rod 65 moves back in the direction of the arrow under the extension of the spring 65ᵃ and through the guide 67 allows the lever 40 to resume its normal working position, so that with the next downward movement of the lever 40 its block 40ᵃ acts upon the lever 47 to restart the repeat mechanism.

What we claim is:—

1. A hack sawing machine comprising, cutting means, an actuating means for said cutting means for automatically making successive cuts, and means for stopping the machine automatically after a single cut of said cutting means.

2. A hack sawing machine comprising, cutting means, actuating means for said cutting means for automatically making successive cuts, and means for automatically stopping the machine after a predetermined number of successive cuts.

3. A hack sawing machine comprising, cutting means, automatic means for operating said means to produce successive cuts, and controlling means for the cutting means to control the cutting operations automatically after a predetermined number of cutting operations.

4. In a hack sawing machine, and in control mechanism for causing the machine to stop after a single cut, or after a predetermined number of successive cuts, the combination with the machine table of a fixed bracket, a stud carried by said bracket, a combined dial and boss wheel axially supported upon the said stud, the boss having ratchet teeth on its periphery except at one part which is left blank, and the dial having a lug on its rear face next the boss and indicator marking on its front face, a pointer alongside the front face of the dial fixed to the said stud, a lever axially supported upon the same stud alongside the boss, a pawl carried by said lever and designed to engage the teeth of the boss, and when the lever is oscillated to rotate the boss tooth by tooth except when opposite the blank, a bearing bracket for the saw frame guides, a lever pivotally supported upon the said bracket, and having lateral projections one of which is arranged to act upon the said pawl-carrying lever each time the saw-frame guide bracket oscillates, another of which is arranged to act upon the lug on the rear face of the dial when such lug has reached a predetermined position and thereby oscillate the lever about its own axis, another of which is arranged to act upon the repeat mechanism of the machine when the lever is not affected by the lug on the dial, while another projection is arranged to strike a part of the machine-starting and stopping mechanism when the lever is oscillated by the lug, substantially as herein set forth.

5. A hack sawing machine, comprising, a cutting means, means for automatically operating said cutting means to make successive cuts, a controlling mechanism for the cutting means for causing the latter to stop after a single cut or after a predetermined number of successive cuts, a pivoted operating lever, and projections formed on said lever and adapted to engage said controlling means to operate the latter.

6. A hack sawing machine comprising, a cutting means, means for automatically operating said cutting means to make successive cuts, a controlling mechanism for the cutting means for causing the latter to stop after a single cut or after a predetermined number of successive cuts comprising a rotatable dial having a lug thereon, an indicating pointer coöperating with said dial, a pivoted controlling lever having projections thereon adapted to engage with said lug, and means associated with said controlling means and coöperating therewith to render said controlling mechanism effective.

7. In a hack sawing machine, the combination of a driving shaft, a saw frame guide bracket journaled on said shaft, a clutch member loose and slidable on the shaft, a further non-sliding clutch member keyed on said shaft, a lever arm and spring for operating the sliding clutch member, a fixed stud below the lever of the driving shaft on which said lever arm is journaled, a further lever arm hanging pendant from the same stud, said lever arms each having a boss and such bosses having parts adapted to lie and move in the same plane and almost touch each other when the lever arms are in their normal positions, and said clutch-lever arm boss also having a projection normally extending radially and horizontally from the boss, a further fixed stud adjacent to the bosses of the lever arms, a spring-actuated bell-crank catch lever journaled on said further stud and normally engaging the said projection on the clutch lever to hold the sliding clutch member clear of the non-sliding clutch member, a lever pivotally mounted on the said saw frame guide bracket, and having a lateral projection which, as the bracket oscillates about the shaft, moves with the lever up and down in the same plane as one arm of the bell-crank lever, and when moving down strikes the said arm and frees the projection on the clutch lever boss, a further shaft at right angles to the driving shaft, a cam on such shaft, adapted, when the shaft is rotated, to push the pendant lever arm away from the vertical, and, after nearly completing a revolution, allow the said lever arm to quickly return to the vertical, and through its boss simultaneously return the clutch lever arm and sliding clutch member to their normal positions, and cause the projection on the clutch lever boss to reëngage the bell-crank catch lever, substantially as herein set forth.

8. In a hack sawing machine, cutting means, repeat mechanism for the cutting means, a controlling lever, a roller adapted to lie over the work to be cut, a lever arm carrying said roller, a rack plate depending from the lever, a spring for exerting a downward pull on said rack plate, a bell-crank lever, one arm of which engages one of the teeth of the rack plate while the other bears against a pin or collar on a sliding and spring-held rod, this latter, when moved by the bell-crank lever, being adapted to impart its movement to the control lever to throw the repeat mechanism out of action, substantially as herein set forth.

9. In a hack sawing machine and in combination, cutting means, a work holding means, automatic means for opening and closing said vise, and means for preventing the loose vise jaw from being adjusted when held open by said opening and closing means, substantially as herein set forth.

10. In a hack sawing machine, a feed roller alongside the vise jaws driven frictionally from the cam or like shaft, in combination with a series of further feed rollers by which the work is supported, and means for transmitting the motion of the first-named roller to all the other rollers, substantially as herein set forth.

11. In a hack sawing machine, a work support, means for cutting the work on said support, work feeding means, means for automatically lowering and holding the support during the forward feeding of the work, and for raising and holding the support during the sawing operations, substantially as herein set forth.

12. A hack sawing machine comprising, cutting means, automatic means for operating said cutting means to produce successive cuts, and adjustable controlling means for the cutting means to render the latter inoperative after a predetermined number of cutting operations.

In witness whereof we have hereunto set our hands in the presence of two witnesses.

EDWARD GEISLER HERBERT.
CHARLES FLETCHER.

Witnesses:
 ERNALD SIMPSON MOSELEY,
 MALCOLM SMETHURST.

Copies of this patent may be obtained for five cents each, by addressing the "Commissioner of Patents, Washington, D. C."